United States Patent [19]

Faure et al.

[11] 4,195,803
[45] Apr. 1, 1980

[54] ANTI-SKID AIRCRAFT BRAKE CONTROL SYSTEM WITH HYDROPLANING PROTECTION

[75] Inventors: Alain J. Fauré; Alain Y. Geoffroy; Louis Signorelli, all of Toulouse, France

[73] Assignee: Societe Nationale Industrielle Aerospatiale, Paris, France

[21] Appl. No.: 936,489

[22] Filed: Aug. 24, 1978

[30] Foreign Application Priority Data

Sep. 9, 1977 [FR] France ............................. 77 27304

[51] Int. Cl.² ........................... B60J 8/10; B64C 25/46
[52] U.S. Cl. .................................. 244/111; 303/106; 303/109
[58] Field of Search ................ 73/488, 507; 244/111; 303/20, 91, 93, 95, 103, 106, 109; 364/426, 565

[56] References Cited

U.S. PATENT DOCUMENTS

| 3,520,575 | 7/1970 | Steigerwald | 244/111 X |
| 3,653,727 | 4/1972 | Kullberg et al. | 303/106 |
| 3,744,849 | 7/1973 | Jonason et al. | 303/109 |
| 4,000,928 | 1/1977 | Takeuchi et al. | 303/103 |
| 4,006,941 | 2/1977 | DeVlieg | 303/103 |
| 4,076,331 | 2/1978 | DeVlieg | 244/111 X |
| 4,089,564 | 5/1978 | Öberg | 303/109 |

Primary Examiner—Barry L. Kelmachter
Assistant Examiner—Reinhard J. Eisenzopf
Attorney, Agent, or Firm—Merriam, Marshall & Bicknell

[57] ABSTRACT

System for braking a vehicle comprising an anti-skid device receiving speed data from a detector coupled to a non-braked wheel, wherein the system comprises a correction device comprising on the one hand first apparatus adapted to tramsmit to the anti-skid device the speed data each time that the variations of these data in time are lower than a deceleration threshold representative of the aquaplaning of the non-braked wheel, and, on the other hand, second apparatus adapted, each time that the variations of the velocity data are greater than the threshold, to transmit to the anti-skid device an estimated decreasing speed datum. The invention is more particularly applied to the braking of aircraft.

8 Claims, 3 Drawing Figures

ANTI-SKID AIRCRAFT BRAKE CONTROL SYSTEM WITH HYDROPLANING PROTECTION

The present invention relates to a system for braking a vehicle, such as an aircraft travelling on the ground. It relates more particularly to a device which makes it possible, in the case of aquaplaning, to maintain the antiskid device of the wheels of the main landing gear of the aircraft in operation, particularly when the speed thereof is measured with the aid of the or each non-braked wheel of the nose gear. It is therefore relative to the action of the devices for regulating the brakes of the main landing gear during the roll phases of an aircraft: landing or acceleration-stop at take-off.

It is known on the one hand that, in these braking regulating devices, the anti-skid device of the wheels of the main landing gear is intended to avoid the locking of the braked wheels and, on the other hand, that these braking regulation devices make it possible to establish a reference sliding of the braked wheels of the main landing gear, with respect to at least one non-braked wheel of the aircraft, by comparison of the speed of these braked wheels with the speed of this non braked wheel of the aircraft, said latter wheel generally belonging to the nose gear of said aircraft.

The difference between these speeds determines the sliding of the wheels of the main landing gear. The regulation of braking generally occurs when the slide exceeds 15%.

If $V_a$ is the tangential speed of the non-braked wheels and V the tangential speed of the braked wheels, the sliding is:

$$g=(V_a-V)/V_a=1=(V/V_a)$$

When the difference between $V_a$ and V becomes too great, (viz. $V < 0.85 V_a$), these regulation devices control the anti-skid of the main landing gear.

Furthermore, in the case of aquaplaning of the non-braked wheels, the datum of speed $V_a$ given by the tachometer generates driven by these wheels is lower than the actual speed of the aircraft. The sliding seen by the anti-skid device therefore reduces and may then reach zero percent, this eliminating the action of this device and possibly causing the locking of the wheels of the main landing gear.

When said main landing gear comprises front wheels and rear wheels (tandem wheels), the front wheels are subject to aquaplaning at speeds substantially equal to those which set off the aquaplaning of the wheels of the nose gear. On the contrary, the rear wheels of the main landing gear are sensitive to this phenomenon only at very clearly higher speeds.

Such lockings of the braked wheels in the case of aquaplaning of the non-braked wheels provoke a more rapid wear of the tires and affect the braking distances, the comfort of the passengers and the maintenance of the aircraft in the correct direction.

The present invention enables these drawbacks to be overcome.

To this end, according to the invention, the system for braking a vehicle, particularly an aircraft travelling over the ground, comprising an anti-skid device avoiding the locking of the braked wheels and receiving speed data from at least one detector coupled to at least one non-braked wheel of said vehicle, is note-worthy in that, between said speed detector and said anti-skid device, the system comprises a correction device comprising, on the one hand, first means capable of transmitting to the anti-skid device said speed data coming from said detector each time that the variations of these speed data with respect to time are lower than a deceleration threshold representative of the aquaplaning of said non-braked wheel and, on the other hand, second means capable, each time that said variations of the speed data are greater than said threshold, of eliminating the action of said first means and of transmitting, at each instant, to said anti-skid device, a decreasing speed datum estimated from the value of said speed data at the moment of the start of said aquaplaning of the non braked wheel.

Said device according to the invention advantageously comprises a first constant current generator associated with a first capacitor so that the ratio of said current to the capacity of said first capacitor is such that the variations of the voltage at the terminals of said latter as a function of time correspond to said deceleration threshold, a second constant current generator associated with a second capacitor so that the ratio of said current to the capacity of said second capacitor is such that the variations of the voltage at the terminals of the latter as a function of time correspond to a usual predetermined deceleration of the vehicle, and switch means capable on the one hand of rendering said first current generator active and the second current generator inactive each time that the variations of said speed data with respect to time are lower that said deceleration threshold and on the other hand of rendering the second current generator active each time that the variations of said speed data are greater than said threshold, said second capacitor being, furthermore, capable of recording the value of said speed data at the moment of the start of the aquaplaning of said non-braked wheel.

To this end, it is advantageous if the output of said speed detector of the non-braked wheel is connected, on the one hand, to the point common to the first current generator and to the first capacitor via a bidirectional rectifier, and, on the other hand, to the point common to the second current generator and to the second capacitor via a first controlled contact.

In a preferred embodiment, the device according to the invention comprises a comparator of which the inputs are connected to the terminals of said bidirectional rectifier and of which the output feeds a relay adapted to actuate said first connected contact.

The device according to the invention may furthermore comprise an amplifier-follower of which one input is connected to the point common to the second current generator and to the second capacitor and of which the output is connected both to said speed detector of the non-braked wheel by a rectifier and to the anti-skid device, the other input of said amplifier-follower being connected on the one hand directly to the output of the latter and on the other hand to the point common to the first constant current generator and to the first capacitor via a second controlled contact actuated by said relay.

Said first controlled contact is preferably of the normally closed type, whilst the second controlled contact is of the normally open type.

When it is desired that the device according to the invention may function when the aquaplaning of the non-braked wheel is produced as soon as an aircraft which is landing makes contact the ground, it is advantage if said device comprises a second relay with two contacts, the first of which, in rest position, may connect the point common to the second current generator and to the second capacitor, to a source of voltage representative of a signal of normal roll speed at the moment of landing, the second contact of said second relay connecting by its rest position a first end of the winding of said second relay to the input of the comparator connected to the speed detector and, by its operating position, said first end of said winding to one of the terminals of the supply voltage of said relay via a rectifier and a normally open contact, actuated by the compression of the main landing gear under load, said first end of said winding being, furthermore, connected to said terminal of the supply voltage of said relay via another rectifier and another contact, normally open, actuated by the compression of the nose gear, when said latter is under load, a voltage threshold being mounted between the operating position of the second contact of the first relay and the corresponding input of the amplifier-follower.

In order to obtain an automatic braking system with constant deceleration, it suffices to dispose, between the said speed detector of the non-braked wheel and the connection device, a contact timed at opening and activated by the stressing of the nose gear.

Such a system may comprise a plurality of different second constant current generators, capable of being connected as desired to said second capacitor via a selector.

The invention will be more readily understood on reading the following description with reference to the accompanying drawings, in which.

In these figures, like elements bear like references. Furthermore, for carrying out the invention, a speed signal could be used, coming from a plurality of tachogenerators coupled with as many non-braked wheels. However, for purposes of clarity, the invention will be explained hereinafter with only one tachogenerator coupled to one non-braked wheel, being used.

For a modern transport aircraft travelling on landing, it may be considered that there is aquaplaning when the deceleration of the non-braked wheels, for example those of the nose gear, is greater than or equal to 10 ms$^{-2}$ for example.

The subject matter of the present invention makes it possible, from a signal representative of the tangential speed Vgt of the non-braked wheels (nose gear) and given by tachometer generators mounted thereon, to elaborate a signal representative of the tangential speed $V_a$ of the aircraft, this enabling the reference sliding $g_c$ of the anti-skid device to be fixed. When no sliding is produced between the ground and the wheels of the nose gear, $V_a = V_{gt}$.

Figure 1:
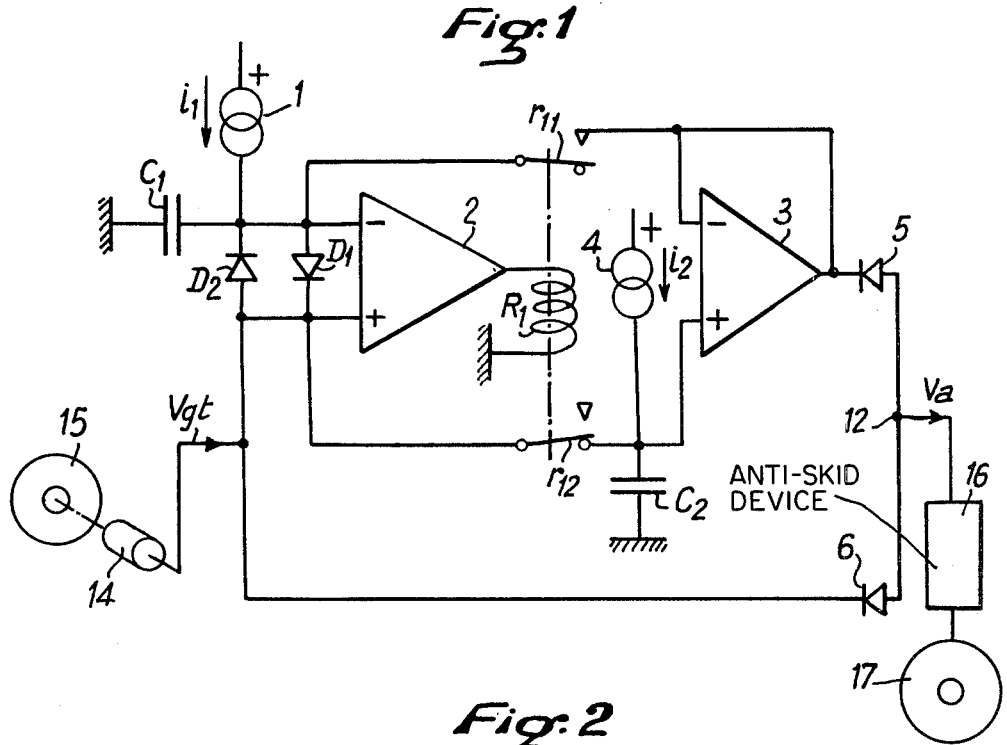
FIG. 1 is a schematic view of the device according to the invention.

The device according to the invention, shown in FIG. 1, comprises a first constant current generator 1 delivering a current i1, and connected in parallel, to a terminal of a first capacitor C1, respectively to two terminals of two diodes D1 and D2 mounted in antiparallel, to the negative input of an amplifier-comparator 2, and to the input of a contact $r_{11}$ of a relay R1, said contact being open at rest.

The coil of said relay R1 is connected on the one hand to the ground of the assembly and on the other hand to the output of the comparator 2. The other terminal of the capacitor C1 is connected to ground.

The positive input of the comparator 2 is connected respectively to the other two terminals of the diodes D1 and D2, to a tachometer generator 14 connected to a non-braked wheel 15 and furnishing the signal $V_{gt}$, to the input of another contact $r_{12}$, closed at rest, of said first relay circuit R1 and, via a diode 6, to the output 12 of the device according to the invention, said output 12 supplying the signal $V_a$ to the anti-skid regulation device 16 acting on the braked wheels 17.

The output of said contact $r_{11}$ is connected, on the one hand, to the negative input of an amplifier-follower 3, and on the other hand to the output thereof, which is connected, via a diode 5, to the output 12 supplying $V_a$.

The output of said contact $r_{12}$ is connected in parallel to the positive input of the amplifier-follower 3, to a terminal of a second capacitor C2, of which the other terminal is connected to ground, and to the output of a second constant current generator 4 delivering a current i2.

It has been seen hereinabove that it may be considered that there is aquaplaning when the deceleration of the wheels of the nose gear (non-braked) is greater than or equal to 10 ms$^{-2}$. Such a deceleration is translated by a determined variation of $V_{gt}$ as a function of time t.

The current i1 and the capacity of the capacitor C1 are such that the ratio i1/C1, which is equal to the variations of the voltage at the terminals of said capacitor as a function of time, corresponds to the determined variation of $V_{gt}$ for a deceleration of 10 ms$^{-2}$.

The voltage $V_{gt}$ supplied by the tachometer generator 14 is negative. Thus, when the deceleration of the non-braked wheel 15 is lower than 10 ms$^{-2}$, part of the current i1 passes through the diode D1, because the voltage delivered by said generator develops along a gradient clearly inferior to that at the terminals of the capacitor C1.

The voltage at the terminals of the capacitor C1, when the nonbraked wheel 15 rotates, in very low (much lower than the supply voltage, for example equal to +5 V, of the generator 1 supplying i1, as it discharges in the tachometer generator 14 via D1). When said generator is set in normal rotation, it supplies at the beginning of landing a negative voltage, for example of the order of 14 volts (for $V_a = 50$ m/s).

Before the wheel 15 rotates, the output of the comparator 2 is therefore negative and the relay R1 remains at rest, the contacts being in the position indicated by FIG. 1.

After the wheel 15 begins to rotate (landing or take-off), and as long as the signal $V_{gt}$ develops at less than 10 ms$^{-2}$, the positive input of the comparator 2 is more negative than its negative input; its output therefore remains negative and the relay R1 remains at rest. The signal $V_{gt}$ is therefore transferred to the output 12 due to the diodes 5 and 6 and the function of anti-skid regulation of the device 16 is performed as if the device according to the invention did not exist. However, the voltage at the terminal of the capacitor C2, and consequently at the output of the follower 3, memorises the value of $V_{gt}$, i2 being without influence and flowing to ground through said generator.

If, during braking aquaplaning of the non-braked wheel 15 begins, $V_{gt}$ tends rapidly towards zero, along a gradient greater than 10 ms$^{-2}$. The voltage at the terminals of the capacitor C1 which has developed more rapidly than $V_{gt}$ during the normal braking phase has become negative, and as soon as $V_{gt}$ develops towards zero, more negative than $V_{gt}$. The current i1 is a longer sufficient to charge the capacitor C1 and the diode D2 is conducting.

Furthermore, the potentials at the inputs of the comparator 2 are inversed and its output becomes positive. The relay R1 is activated and its contacts $r_{11}$ and $r_{12}$ pass into operating position. The capacitor C2 is insulated from $V_{gt}$ and the generator 4 becomes active. The current i2 and the capacity of C2 are such that the voltage at the terminals of C2 develops like $\Delta V/\Delta t = 1.5$ ms$^{-2}$, this representing the normal deceleration of an aircraft on landing.

The value of $V_{gt}$ (negative voltage) memorised in C2 at the moment of the beginning of aquaplaning and reduced by the quantity $i_2 \times t$ is therefore at the output of the follower 3 and at the output 12. It is and remains substantially equal to the value of $V_{gt}$ which would have been supplied by the generator 14 if there had not been any aquaplaning, this enabling an efficient braking regulation to be maintained, by supplying a value very close to the speed of the aircraft. $V_{gt}$ being much lower than Va, even zero, no longer has, at this moment, any influence on the output signal at point 12.

On the contrary, this value $V_{gt}$ of the beginning of the aquaplaning is reinjected at its last significant value on the negative input of the follower 3, for confirmation, and on the negative input of the comparator 2 via the first contactor $r_{11}$ so as to maintain the relay R1 in operating position.

In fact, $V_{gt}$ being for example stable at zero, the diode D1 would start to conduct again, the output of the comparator 2 would become negative and the relay R1 would tip again at rest. This can be produced only if $V_{gt}$ becomes substantially equal to the voltage at the terminals of C2, i.e. at the end of braking, or if the aquaplaning ceases. At this moment, normal operation is resumed after retipping of R1 at rest.

It is recalled that a negative signal on a negative input of a comparator gives a positive output signal, which is not the case of a follower such as follower 3.

The device of FIG. 1 therefore allows the braking regulation to be maintained in the case of aquaplaning, but it cannot function correctly in the case of aquaplaning being produced upon touchdown of the nose gear (non-braked wheels) on the ground.

In this case, the tachometer generator 14 would never be driven in normal rotation, and the relay R1 would not pass into operating position.

Furthermore, it is advantageous to brake the aircraft before the stall of the nose gear, and, in this case, to have an operative braking regulation, which is why it is necessary to supply speed data to the regulation device.

Figure 2:
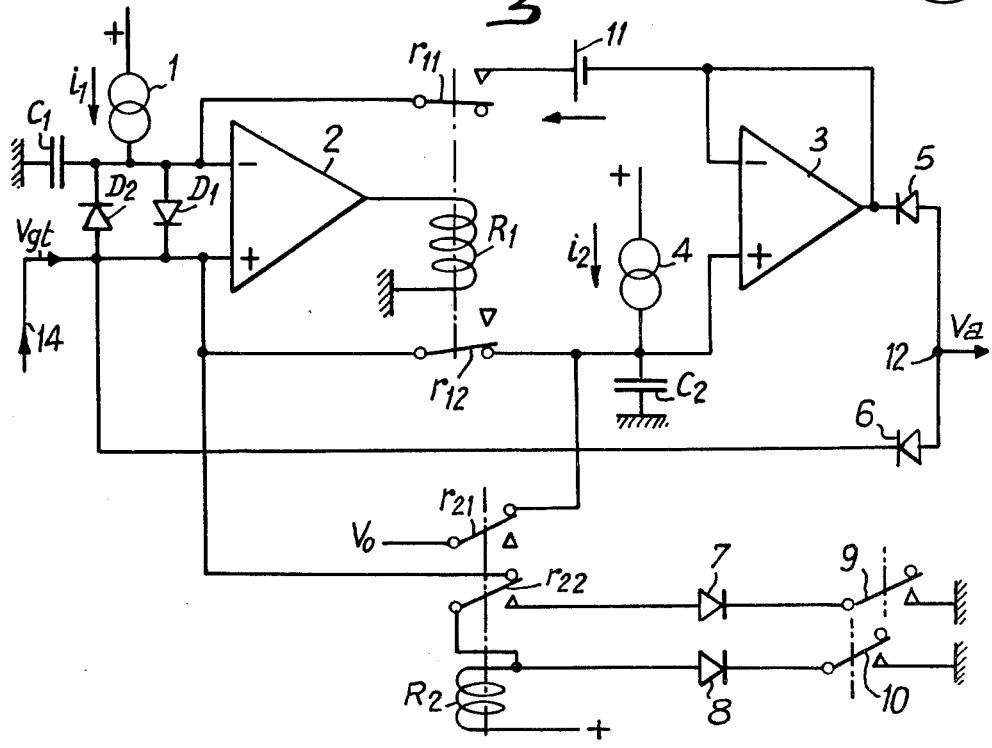
FIG. 2 is a schematic view of a device according to the invention more particularly intended for an aircraft and enabling the aquaplaning to be taken into account as soon as the nose gear touches the ground on landing.

This is why the device of FIG. 2 has been completed to correspond to these cases of functioning. In this device, the elements of the device of FIG. 1 are found again with the same references, and the following complementary elements:

A second relay R2 comprising a first contact $r_{21}$ which, at rest, connects a voltage source Vo to the point of connection of C2 and of the current generator 4, a second contact $r_{22}$ connecting at rest the positive input of the comparator 2 to a first end of the coil of said relay R2, the second end of which is connected to a positive voltage source, for example of 28 volts, an absorber contact 9 of the main landing gear, closed when said gear is under stress, disposed between the ground of the assembly and the working contact of said second contact $r_{22}$ of R2 via a diode 7, an absorber contact 10 of the nose gear (non-braked wheels) closed when said nose gear is under stress, disposed between the earth of the assembly and the first end of the coil of R2, via a diode 8.

A voltage source 11, for example of 3 volts, representing a threshold, is disposed in series between the contact $r_{11}$, in operating position, of the first relay R1 and the negative input of the amplifier-follower.

The (negative) voltage Vo represents the normal signal $V_{gt}$ at the moment of landing.

For example, one may have Vo = 14 volts for a roll speed of 50 meters per second (180 km/hr).

Thus, before landing and up to touch-down of the nose gear, the voltage of 28 volts supplying the relay R2 is transferred to the positive input of the comparator 2, of which the output is therefore positive, and the relay R1 is in operating position (position of the contacts reverse of that of FIG. 2). The device according to the invention therefore functions at this moment as if there were aquaplaning, but with the voltage Vo which remains constant at the terminals of C2, and representing the normal landing speed. Vo is therefore found again at the output of the amplifier-follower 3 and at the output 12, $V_{gt}$ being equal to zero. Consequently, the regulation of braking may function as soon as the aircraft is travelling on its main landing gear, since it has speed data equivalent to the data coming from the non-braked wheels.

Moreover, Vo is also found again on the negative input of the comparator 2, via the voltage 11 and said contact $r_{11}$ of R1, which is closed. The generator 4 remains inoperative, i2 being without influence since it flows through the ground of the voltage source Vo. The voltage threshold 11, of 3 volts, is subtracted from Vo and enables a clear switching to be obtained when the nose gear touches down and rolls normally, when $V_{gt} = (Vo - i2t) - 3$ volts. At this moment, $V_{gt}$ becomes clearly greater than the voltage transferred on the negative input of 2, and D1 may again be conducting.

It should be noted that, in this case (no aquaplaning), t represents the duration of rotation of the wheels of the nose gear.

When the nose gear makes contact with the ground, the contactor 10 closes, activating the coil of the relay R2.

The contacts $r_{21}$ and $r_{22}$ of R2 pass into operating position.

The contact 9 of the main landing gear is already closed and confirms the activation of the coil of R2 in the case of the nose gear bouncing, this having for its consequence the opening of the contact 10 again.

At this moment, the voltage Vo is cut from C2 and the voltage of 28 volts is insulated from the negative input of the comparator 2. If there is aquaplaning, $V_{gt}$ remains zero or much lower than Vo and R1 remains in operating position, due to the voltage (Vo − 3 volts) which is found on the negative input of the comparator 2. The voltage (Vo) is found at the output 12 and is supplied to the braking regulator. Then, the voltage Va on the output 12 becomes $Va = Vo - i2t$. On the negative input of the comparator 2, the voltage is $(Vo - i2t) - 3$ volts. When the phenomenon of aquaplaning ceases, the voltage $V_{gt}$ reaches the value $V_{gt}=(V_o-i2t)-3$ volts and the device functions like the one of FIG. 1.

If there is no aquaplaning, $V_{gt}$ has its normal value and causes the relay R1 to tip in rest position, since $V_{gt}=(V_o-i2t)-3$ volts, as $V_{gt}$ is always greater than or equal at any moment to $(V_o-i2t)$, Vo representing the minimum possible speed at the moment of touch down of the nose gear. $V_{gt}$ is therefore found again in these conditions at the output 12.

If aquaplaning is produced after a certain time, the device functions as in the device of FIG. 1, as $V_{gt}$ is memorized on C2 and i2 is operative only when the second contact $r_{12}$ of R1 is open.

It should be noted that it is possible with the aid of the device according to the invention, combined with the anti-skid device 16, to make an automatic braking device with constant deceleration.

In fact, the device according to the invention behaves, when $V_{gt}$ is zero, like an automatic braking control circuit with constant deceleration, i.e. it supplies a speed signal to which the aircraft must tend by action on the brakes, said speed signal having a law of linear decrement.

In order systematically to use, under these conditions, the device according to the invention, the speed of the aircraft upon touch down of the nose gear must be memorised, a deceleration must be displayed and the data $V_{gt}$ cut.

The signal at the output 12 then controls the deceleration via said device 16 which modulates the braking pressure as a function of the comparison of signal at the output 12 ($V_a$) and the signal issuing from the tachometer generators activated by the braked wheels (of the main landing gear).

Figure 3:
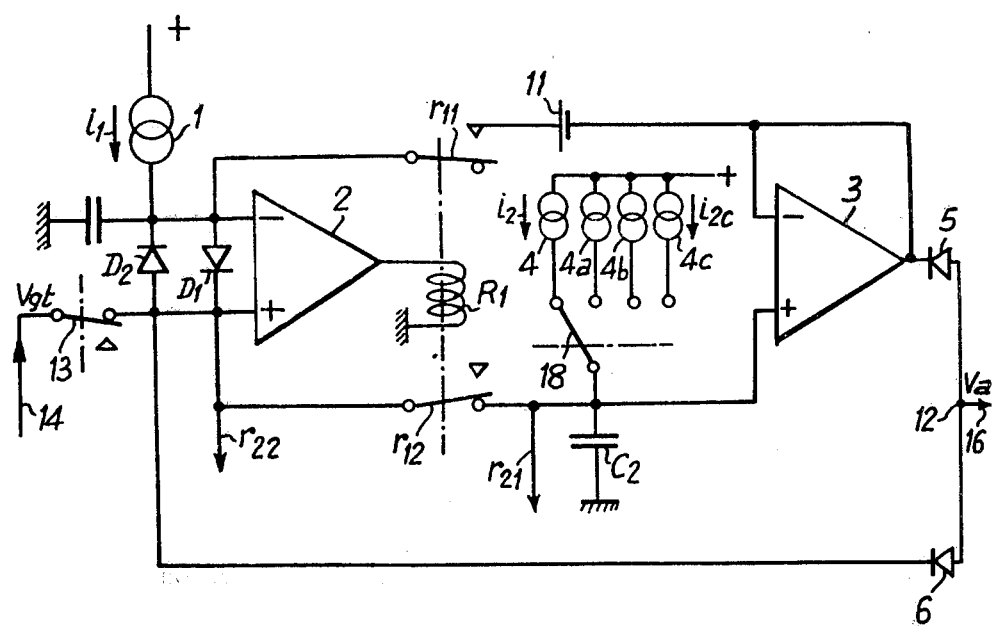
FIG. 3 shows the diagram of an improved embodiment of the device according to the invention, enabling an automatic braking to be effected with constant deceleration.

FIG. 3 shows the device modified to allow this systematic use. It then comprises all the elements of FIG. 2, of which certain, unnecessary for understanding this use, are not shown.

A contact 13, timed at opening and activated by the stressing of the nose gear is disposed, between the tachometer generator 14 of said nose gear and the positive input of said comparator 2.

A plurality of constant current generators, for example four: 4, 4a, 4b, 4c, may respectively supply four different currents i2 or i2a or i2b or i2c to the capacitor C2, via a deceleration detector 18.

Thus, upon landing and as before, Vo, then if there is no aquaplaning, $V_{gt}$, are memorized on C2, then $V_{gt}$ is cut by the contactor 13 a little after touch down of the nose gear and the device then behaves as if there were aquaplaning and supplies to point 12 a speed signal of constant decrement, said decrement (allowing a deceleration to be defined) having been chosen with the aid of the selector 18.

Said selector makes it possible to direct on the capacitor C2 a more or less strong current which will charge it more or less rapidly, and therefore to cause the speed signal at the terminals of C2 and consequently at the output 12 ($V_a$) to develop more or less rapidly.

The different currents respectively supplied therefore enable different decelerations to be obtained, as a function of the state and length of the landing runway.

The speed Vo may also be chosen according to different values with the aid of a selector supplied by voltages corresponding to these different values.

To effect this type of functioning, a pressure slightly greater than normal braking pressure must be allowed in the brakes and maintained upon touch down of the main landing gear at the moment of landing.

It is possible, without departing from the scope of the invention, to use electronic relays in place of the relays described, or to use a Zener diode as voltage threshold, or elements equivalent to the components described and producing the same effects or contributing to the same results.

What we claim is:

1. In a system for braking wheels of a vehicle, particularly an aircraft travelling on the ground, comprising an anti-skid device avoiding the locking of the braked wheels and receiving speed data from at least one detector coupled to at least one non-braked wheel of the vehicle, the improvement comprising, between said speed detector and said anti-skid device, a correction device comprising:

first means capable of transmitting to the anti-skid device said speed data coming from said detector each time that the variations of these speed data with respect to time are lower than a deceleration threshold representative of aquaplaning of said non-braked wheel, said first means comprising a first constant current generator associated with a first capacitor so that the ratio of said current to the capacity of said first capacitor is such that the variations of the voltage at the terminals of said later as a function of time correspond to said deceleration threshold, second means capable of transmitting, at each instant, to said anti-skid device, a decreasing speed datum estimated from the value of said speed data at the moment of the start of said aquaplaning of the non-braked wheel, said second means comprising a second constant current generator associated with a second capacitor so that the ratio of said current to the capacity of said second capacitor is such that the variations of the voltage at the terminals of the latter as a function of time correspond to a usual predetermined deceleration of the vehicle, said second capacitor being capable of recording the value of said speed data at the moment of the start of the aquaplaning of said non-braked wheel, and switch means capable of rendering said first current generator active and said second current generator inactive each time that the variations of said speed data with respect to time are lower than said deceleration threshold and of rendering the second current generator active each time that the variations of said speed data are greater than said threshold.

2. A system as claimed in claim 1, wherein the output of said speed detector of the non-braked wheel is connected, on the one hand, to the point common to the first current generator and to the first capacitor via a bidirectional rectifier, and, on the other hand, to the point common to the second current generator and to the second capacitor via a first controlled contact.

3. A system as claimed in claim 2, wherein said correction device comprises a comparator of which the inputs are connected to the terminals of said bidirectional rectifier and of which the output feeds a relay adapted to actuate said first controlled contact.

4. A system as claimed in any one of claims 1 to 3, wherein said correction device comprises an amplifier-follower of which one input is connected to the point common to the second current generator and to the second capacitor and of which the output is connected both to said speed detector of the non-braked wheel by a rectifier and to the anti-skid device, the other input of said amplifier-follower being connected on the one hand directly to the output of the latter and on the other hand to the point common to the first constant current generator and to the first capacitor via a second controlled contact actuated by said relay.

5. A system as claimed in claim 4, wherein said first controlled contact is preferably of the normally closed type, whilst the second controlled contact is of the normally open type.

6. A system as claimed in claim 4, adapted for an aircraft comprising a main landing gear with braked wheels and a nose gear with at least one non-braked wheel, wherein said device comprises a second relay with two contacts, the first of which, in rest position, may connect the point common to the second current generator and to the second capacitor, to a source of voltage representative of a signal of normal roll speed at the moment of landing, the second contact of said second relay connecting by its rest position the first end of the winding of said second relay to the input of the comparator connected to the speed detector and, by its operating position, said first end of said winding to one of the terminals of the supply voltage of said relay via a rectifier and a normally open contact, actuated by the compression of the main landing gear under load, said first end of said winding being, furthermore, connected to said terminal of the supply voltage of said relay via another rectifier and another contact, normally open, actuated by the compression of the nose gear, when said latter is under load, a voltage threshold being mounted between the operating position of the second contact of the first relay and the corresponding input of the amplifier-follower.

7. A system as claimed in claim 6, wherein said system comprises, between the said speed detector of the nonbraked wheel and the connection device, a contact timed at opening and activated by the stressing of the nose gear.

8. A system as claimed in claim 7, wherein said system comprises a plurality of different second constant current generators, capable of being connected as desired to said second capacitor via a selector.

* * * * *

UNITED STATES PATENT AND TRADEMARK OFFICE
CERTIFICATE OF CORRECTION

PATENT NO. : 4,195,803
DATED : April 1, 1980
INVENTOR(S) : ALAIN J. FAURE ET AL.

It is certified that error appears in the above-identified patent and that said Letters Patent are hereby corrected as shown below:

Abstract, line 5, "tramsmit", should be --transmit--.

Col. 1, line 34, "$g=(V_a-V)/V_a=1=(V/V_a)$", should be --$g=(V_a-V)/V_a=1-(V/V_a)$--.

Col. 1, line 41, "generates", should be --generators--

Col. 3, line 66, "il", should be --i1-- (i one).

Col. 4, line 45, "in" should be --is--

Col. 5, line 8, "a" should be --no--.

Col. 6, line 43, "(Vo=i2t)" should be --(Vo-i2t)--.

Col. 8, line 29, "later" should be --latter--.

Signed and Sealed this

Third Day of February 1981

[SEAL]

Attest:

RENE D. TEGTMEYER

Attesting Officer

Acting Commissioner of Patents and Trademarks